UNITED STATES PATENT OFFICE.

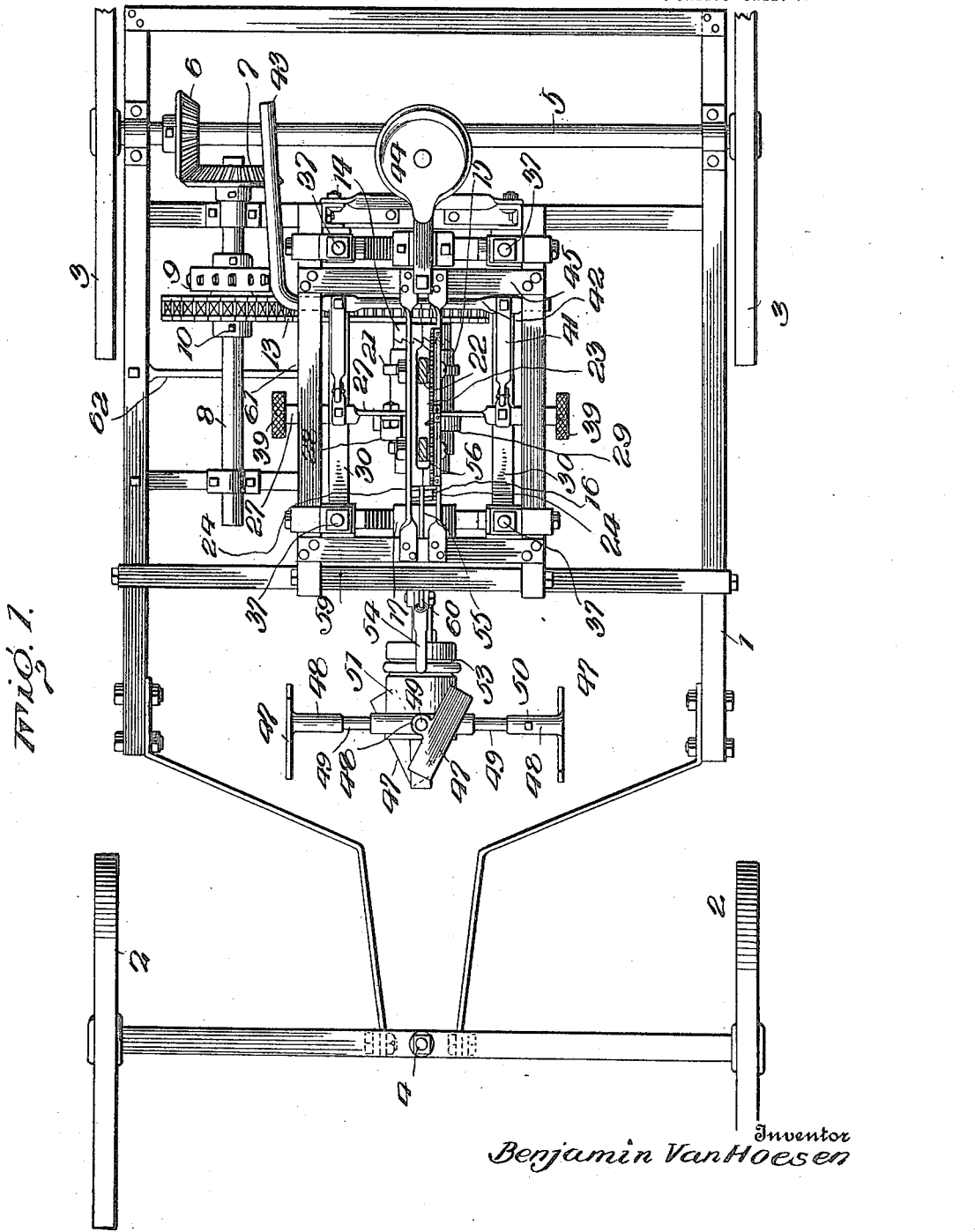

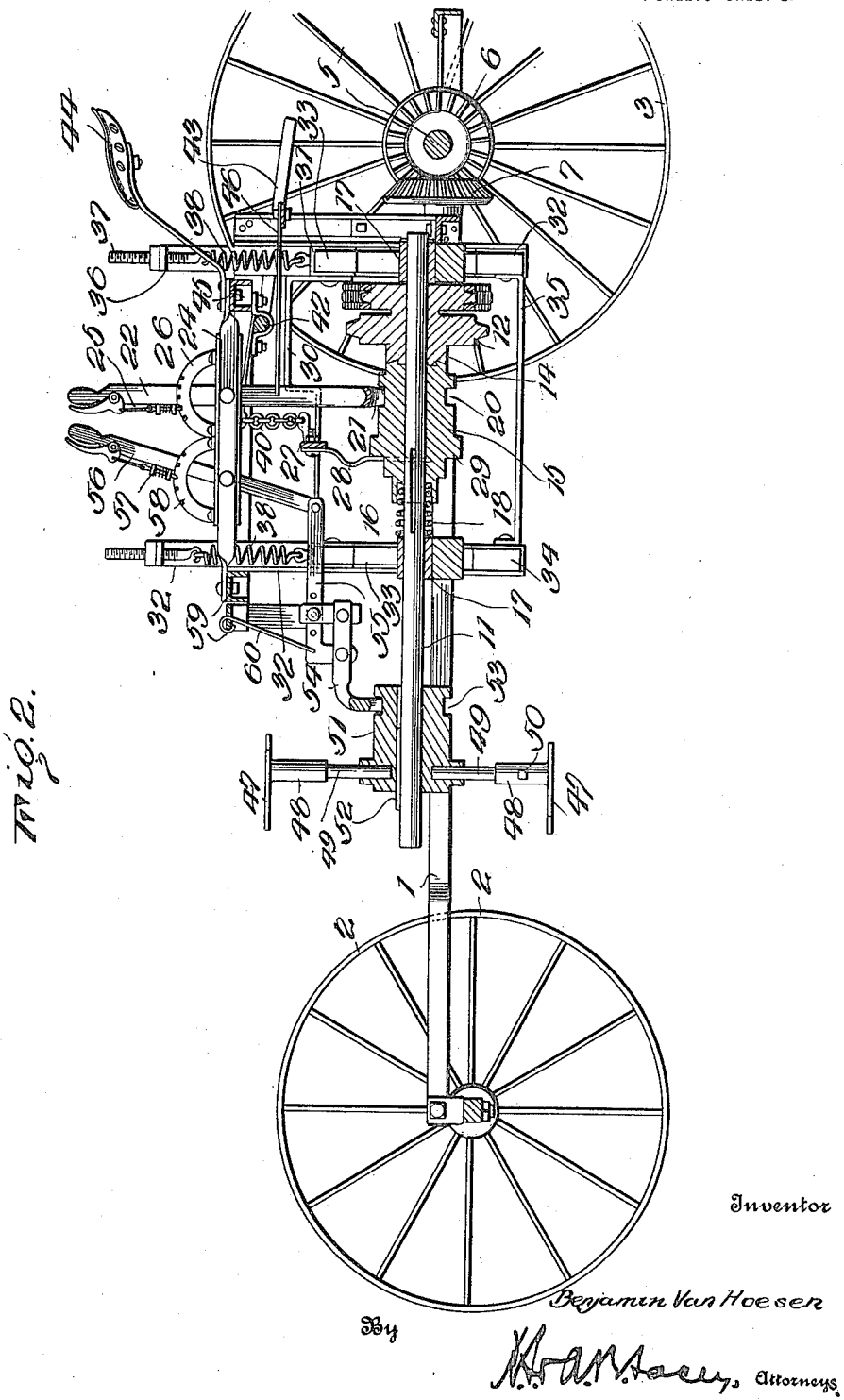

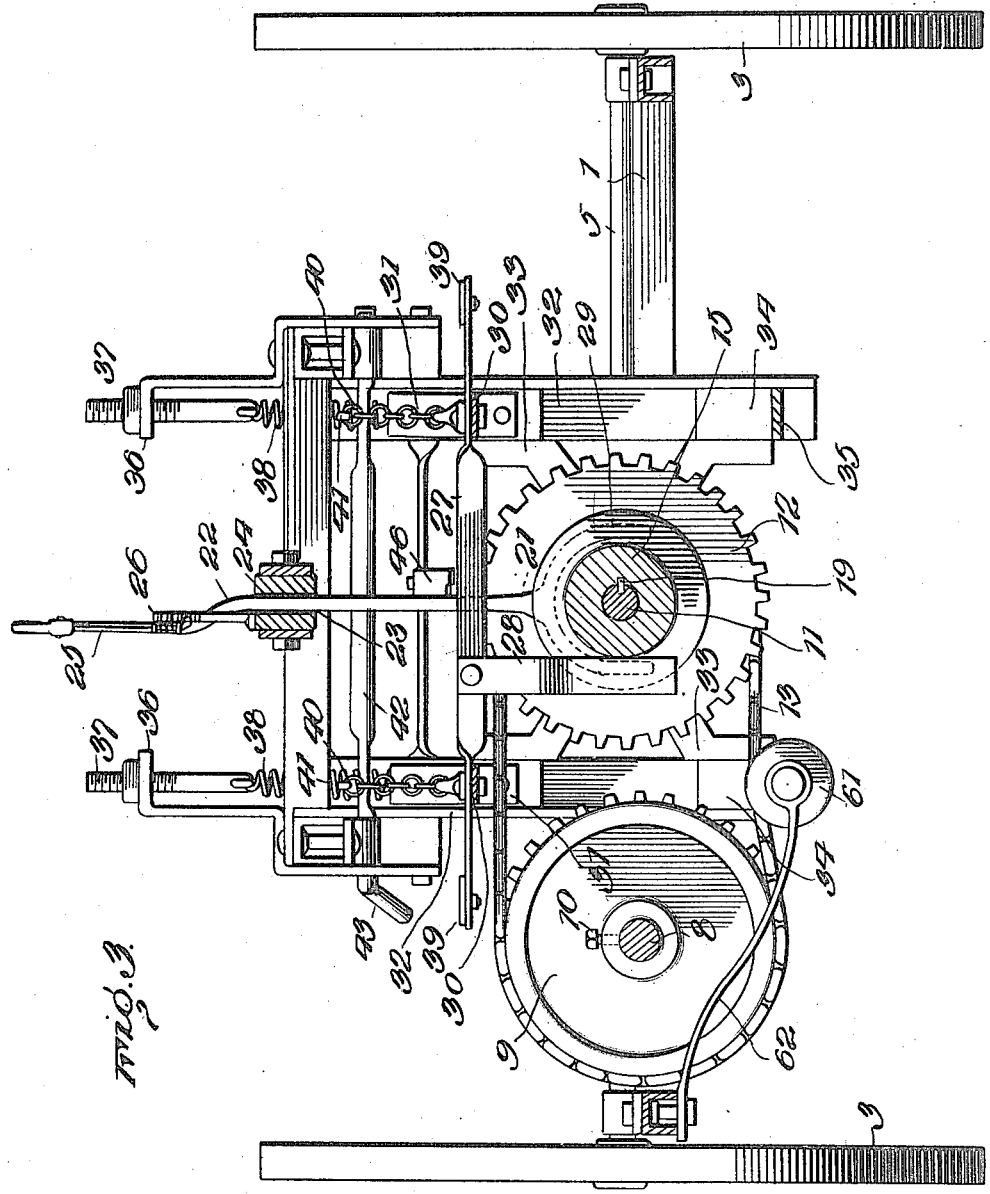

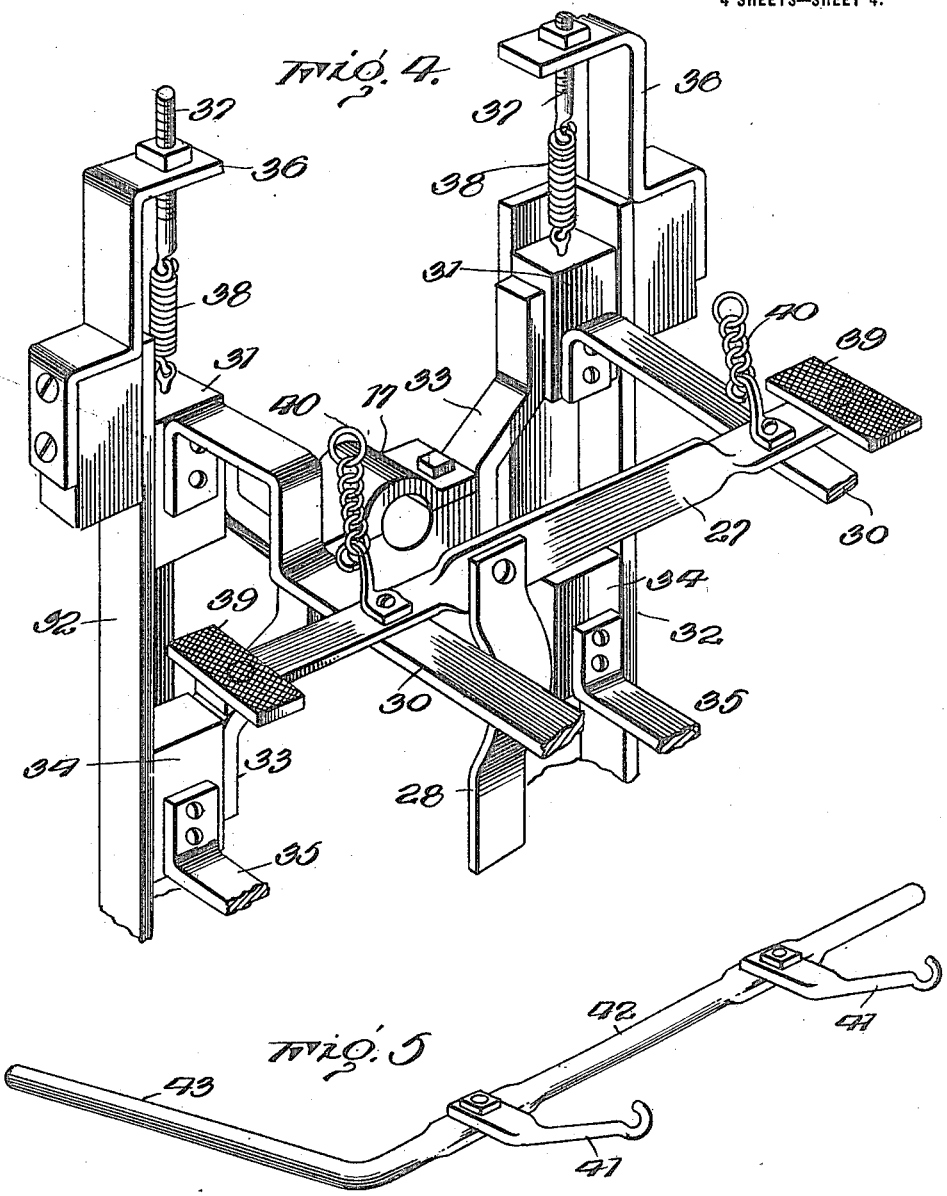

BENJAMIN VAN HOESEN, OF MART, TEXAS.

COTTON-CHOPPER.

1,214,977. Specification of Letters Patent. Patented Feb. 6, 1917.

Application filed November 27, 1915. Serial No. 63,804.

*To all whom it may concern:*

Be it known that I, BENJAMIN VAN HOESEN, a citizen of the United States, residing at Mart, in the county of McLennan and State of Texas, have invented certain new and useful Improvements in Cotton-Choppers, of which the following is a specification.

This invention relates to cotton choppers and has for its object the provision of a cotton chopper in which the blades or hoes may be shifted during the travel of the machine to avoid cutting out a plant which it may be desired to leave standing and also to provide means whereby the rotation of the blades may be instantly arrested. A further object of the invention is to provide means whereby the hoes may be caused to operate in a plane below the general level of the field over which the machine is being drawn. A further object of the invention is to provide means whereby the chopper shaft and the blades thereon may be adjusted to operate at any desired level, and other objects of the invention will appear as the description of the same proceeds.

The invention is illustrated in the accompanying drawings and consists in certain novel features which will be particularly pointed out in the claims following the detailed description.

In the accompanying drawings:

Figure 1 is a plan view of a machine embodying my present improvements;

Fig. 2 is a central longitudinal sectional view of the same;

Fig. 3 is a transverse section;

Fig. 4 is a detail perspective view of a portion of the machine showing more especially the means for adjusting the level or height at which the blades will operate;

Fig. 5 is a detail perspective view of a part of the mechanism which supports the chopper shaft at a desired height.

In carrying out my invention, I employ a frame 1 which may be of any desired form and of any preferred material, being generally constructed of angle or channel iron. This frame is supported upon front and rear ground wheels 2 and 3, the front wheels 2 being mounted upon a king bolt 4 whereby the machine may be permitted to readily turn corners. A tongue or pole will also be connected with the axle of the front wheels but this tongue or pole has been omitted from the illustration as it is of well known construction.

Upon the rear axle or driving shaft 5 to which motion is transmitted by the rear ground wheels 3 rigidly secured thereon, I secure a bevel gear 6 which meshes with a similar gear 7 upon the rear end of a transmission shaft 8 which is mounted in suitable bearings carried by the frame and extends longitudinally of the frame as shown most clearly in Fig. 1. Upon this transmission shaft 8 is mounted a double sprocket 9 which is secured at any desired point along the shaft by means of one or more set screws 10 fitted in its hub and bearing upon the shaft. The chopper shaft 11 is disposed along the central longitudinal plane of the frame and upon the said shaft is loosely mounted a double sprocket 12 which is connected by a chain 13 with the sprocket 9 on the transmission shaft. It will be readily understood that by shifting the sprocket 9 and bringing either member thereof into alinement with either member of the sprocket 12 and causing the chain 13 to pass around the alined members, a plurality of different speeds may be imparted to the chopper shaft, as may be desired. The forward member of the sprocket 12 is provided with a clutch hub, indicated at 14, and this clutch hub is adapted to be engaged by a clutch 15 slidably mounted upon the chopper shaft but constrained to rotate therewith. A spring 16 is coiled around the shaft between a bearing 17 and the front end of the clutch 15 and serves to normally hold the clutch to the clutch hub 14 so that the said members will be engaged and the rotation of the sprocket 12 imparted through the clutch to the chopper shaft. The clutch may be mounted in any convenient or preferred manner to rotate with the chopper shaft and I have illustrated a key-way 18 in which is seated a key 19 engaging both the shaft and the clutch, as will be readily understood. The clutch is constructed with the usual annular groove 20 which is engaged by a yoke or fork 21 at the lower end of a lever 22 which is extended upwardly through a longitudinal slot 23 in a beam 24 upon the main supporting frame and is fulcrumed upon the said beam, the usual latch 25 being provided adapted to engage the holding segment 26 whereby the lever may be held in position to hold the clutch either in or out of engagement with the sprocket. A cross bar 27 is disposed in advance of the lever 22 and a leaf-spring or resilient plate 28 is secured to and depends from said cross bar in advance of the clutch member 15 so that, when said member is moved forwardly upon the chopper shaft out of engagement with the sprocket 12, an annular shoulder 29 thereon will be brought against the plate 28 which, consequently, will act as a brake to arrest the rotation of the clutch and the chopper shaft.

The cross bar 27 is secured upon longitudinal bars or beams 30 which form part of the frame for supporting the chopper shaft. These bars 30 are secured at their ends to blocks 31 which are slidably fitted against standards 32 forming part of the main frame. The said sliding blocks are connected by brackets 33 with similar lower blocks 34, as shown most clearly in Fig. 4, the said lower blocks 34 being connected by longitudinal bars or beams 35 upon which the cultivator or plow shovels may be hung. The posts or standards 32 are provided at their upper ends with overhanging brackets 36 in which are mounted eye-bolts or screw hooks 37 to the lower ends of which are attached the upper ends of springs 38 which have their lower ends attached to the blocks 31, as clearly shown in Fig. 4. The bearings 17 for the chopper shaft are secured to and extend between the brackets 33 and it will be readily understood that by adjusting the bolts or hooks 37, the chopper frame and shaft may be supported at any desired height upon the main frame. The ends of the cross bar 27 project laterally beyond the sides of the beams 30 and are equipped with foot rests 39 upon which the feet of the driver may be placed. Chains 40 are also secured to said cross bar 27 and the upper ends of these chains are engaged over hooks 41 on a rock shaft 42 which is suitably journaled upon the main frame and has one end extended rearwardly to form a lever or handle 43 disposed where it may be conveniently operated by the driver upon the seat 44 which is supported upon the rear cross bar 45 of the main frame.

Should the driver observe that the machine is approaching a plant or plants which are growing at a level below the general level of the row being treated, he may press downwardly upon the cross bar 27 by means of the foot rests 39 and thereby depress the chopper frame against the tension of the springs 38 and, when the low spot has been passed, the chopper frame will return to its normal position under the influence of the springs 38 if the pressure upon the foot rests or treadle be released. If the machine be approaching plants which are above the normal level, the driver may press downwardly upon the lever 43 with one foot and thereby rock the shaft 42 so as to exert an upward pull upon the cross bar 27 and chopper frame through the hooks 41 and the chains 40. After the high place has been passed, the pressure upon the lever 43 may be removed and the tension of the springs 38 will be free to act with the weight of the chopper frame to return the same to the normal level. It will be readily understood that the yoke 21 permits the clutch 20 to slide therein so that rotation of the chopper shaft and the blades will not be impeded or interfered with in any way by the vertical adjustment of the chopper frame. If it be desired to lock the clutch 15 out of engagement with the clutch hub 14, the detent 46 may be employed. This detent is a tongue or bar provided with a notch in its forward end to engage the lever 22. It is pivoted at its rear end upon any convenient part of the main frame and may be shifted laterally by a light tap from the foot of the driver, as will be readily understood.

The chopper blades 47 may be provided in any desired number and are each disposed at an angle to the line of travel, as shown most clearly in Fig. 1. Each blade consists of a plate having a beveled or otherwise sharpened cutting edge and provided with a socket or sleeve 48 adapted to engage a shank or stem 49 and secured on said stem or shank by a set screw 50. The blades may thus be set at any desired angle and may be also adjusted along the stem or shank so as to strike the plants in such a manner as to most readily cut through the stalks and also facilitate the accurate adjustment of the working mechanism to the level of the ground over which the machine travels. The inner ends of the stems or shanks 49 are secured to a sleeve 51 which is fitted upon the chopper shaft 11 and connected therewith by a key 52 so that it may slide longitudinally of the shaft but will be forced to rotate therewith. The stems or shanks 49 are preferably disposed at the front end of the sleeve 51 and in rear of the said stem or shanks, the sleeve is provided with an annular groove 53 which is engaged by the forked end of the shifting bar 54 which may be formed on or adjustably secured to a carrier bar 55. The rear end of this carrier bar 55 is pivoted to the lower end of a lever 56 which is fulcrumed upon the beam 24 within the slot 23 and in advance of the lever 22, as clearly shown. The lever 56 is provided with the usual detent 57 engaging a holding segment 58. The front portion of the carrier bar 55 is suspended from the cross bar 59 of the main frame by a link 60 which has its upper end suitably hung for swinging movement upon said cross bar and its lower end pivotally attached to the carrier bar, as shown most clearly in Fig. 2. The lever 56 may be easily manipulated by the driver from the seat 44 and serves to advance or retract the sleeve 51 so that the chopper blades may be caused to strike a plant which it is desired to cut out or miss a plant which would, in normal operation, be cut out, as may be desired.

The construction and arrangement of the several parts of my improved machine having been made known, it is thought the operation and advantages of the same will be readily understood and appreciated. The machine is drawn over the field along a row of plants in the usual manner and motion will be imparted to the chopper shaft from the ground wheels through the described gearing which may be adjusted, as set forth, so as to operate the chopper shaft at any desired speed. Where the plants are of uniform growth and at a uniform level, the chopper blades will strike the plants at regular intervals and cut out plants so that plants not struck by the blades will be left at equal distances apart. Should the plants not be of uniform size and quality, the operator may readily select the plants to be cut out. Should he observe that the chopper blades are about to strike a desirable plant, he may swing the lever 56 about its fulcrum so as to advance or retract the chopper longitudinally of the chopper shaft, and thereby vary the interval of cutting so that the plant to be saved will not be struck by the blades. If the machine should reach a stretch where the plants are thin and cutting out is not needed, the lever 22 may be swung about its fulcrum so as to release the clutch 15 from the clutch hub 14 and this movement of the clutch will carry it against the brake spring 28 so that the operation of the clutch and chopper shaft will be instantly arrested. If it be desired to hold the chopper shaft inoperative, the lever 22 is swung so as to disengage the clutch 15 from the clutch hub 14 and the detent 46 is swung in position behind the lever so as to prevent the spring 16 causing the clutch to reëngage. The machine may then be drawn over a road or from field to field without liability of the chopper blades being set in motion. The vertical movement of the chopper shaft and the frame in which it is carried will not affect the operativeness of the members 21 and 54 nor the brake spring, inasmuch as the brake spring will be long enough to be in front of the clutch member 15 and engage the same in either its highest or its lowest position. The members 21 and 54 are open at their lower ends so that they do not interfere with the vertical movement of the shaft and the sleeves mounted thereon but are long enough to be constantly in engagement therewith. Disengagement of the sprocket chain 13 during vertical movement of the chopper frame, is prevented by an idler 61 which is carried by the inner end of a resilient arm 62 secured upon the main frame. This idler bears constantly upon the under run of the sprocket chain and thereby holds the chain in engagement with the sprocket wheels at all times.

My improved machine is very simple in the construction and arrangement of its several parts and all parts are accessible so that repairs may be easily made. It may be readily adjusted to run at any desired height and by its use the plants may be cut out at regular intervals or any desired plants left standing as hereinbefore described.

Having thus described the invention, what is claimed as new is:

1. The combination of a supporting frame, a driving shaft mounted thereon, a chopper shaft mounted upon the frame, means for transmitting motion from the driving shaft to the chopper shaft including a gear loosely mounted upon the chopper shaft and having a clutch hub, a clutch member slidably mounted upon the chopper shaft but constrained to rotate therewith and adapted to engage said clutch hub, a spring bearing upon said clutch member and holding it normally in engagement with the clutch hub, means for disengaging said member from the clutch hub, and a brake disposed adjacent the slidable clutch member and engaged by the same when it is disengaged from the clutch hub.

2. The combination of a supporting frame, a driving shaft mounted thereon, a chopper shaft mounted upon the frame, means for transmitting motion from the driving shaft to the chopper shaft comprising a gear loosely mounted upon the chopper shaft and having a clutch hub, a clutch member slidably mounted upon the chopper shaft and constrained to rotate therewith, means for holding said clutch member normally in engagement with the clutch hub, the clutch member being provided with an annular shoulder in its forward portion, a brake spring supported above said slidable clutch member and depending in advance of said annular shoulder to be engaged by the same, and means for releasing the said slidable clutch member from the clutch hub.

3. The combination of a supporting frame, a driving shaft mounted thereon, a chopper shaft carried by the frame, means for moving said chopper shaft in a vertical plane, means for transmitting motion from the driving shaft to the chopper shaft including a gear mounted upon the chopper shaft and having a clutch hub, a slidable clutch member mounted on the chopper shaft and constrained to rotate therewith and adapted to engage said clutch hub, a lever fulcrumed above the said slidable clutch member and having a yoke at its lower end engaging the same, and a brake supported above the slidable clutch member and depending past the same to be engaged thereby in any vertical position of the chopper shaft.

4. The combination of a main frame comprising rectangularly spaced standards having overhanging brackets at their upper ends, a chopper frame disposed between said standards and having its corners slidably fitted thereto, adjustable suspending devices mounted in the said brackets, springs connecting said suspending devices with the respective corners of the chopper frame, a chopper shaft mounted upon the chopper frame, a driving shaft on the main frame, and means for transmitting motion from the driving shaft to the chopper shaft.

5. The combination of a main frame comprising standards provided with overhanging brackets at their upper ends, upper blocks slidably fitted to said standards and yieldably suspended from said overhanging brackets, lower slidable blocks arranged below the first-mentioned blocks, brackets connecting the upper and lower blocks, bearings secured to and extending between the said brackets, a chopper shaft mounted in said bearings, a driving shaft upon the main frame, and means for transmitting motion from the driving shaft to the chopper shaft.

6. The combination of a main frame comprising standards provided with overhanging brackets at their upper ends, blocks slidably fitted to said standards and yieldably suspended from said overhanging brackets, connections between said blocks, bearings carried by said connections, a chopper shaft mounted on said bearings and disposed longitudinally of the main frame, a driving shaft upon the main frame, and means for transmitting motion from the driving shaft to the chopper shaft.

7. The combination of a chopper shaft, means for rotating the same, a sleeve slidably mounted on said shaft and constrained to rotate therewith, chopper blades carried by the said sleeve, a lever fulcrumed above the chopper shaft, a link disposed in advance of said lever, a carrier bar pivoted to the lower ends of said lever and said link, and a yoke carried by said bar and engaging said sleeve.

In testimony whereof, I affix my signature.

BENJAMIN VAN HOESEN. [L. S.]

Copies of this patent may be obtained for five cents each, by addressing the "Commissioner of Patents, Washington, D. C."